United States Patent [19]
Chapman et al.

[11] 3,796,315
[45] Mar. 12, 1974

[54] TWIN RAKE MECHANICAL CLASSIFIER

[76] Inventors: William A. Chapman, 3032 Bethwood Ln., Lithonia, Ga. 30058; Nelson Severinghaus, 213 Glenn Cir., Decatur, Ga. 30032

[22] Filed: Sept. 9, 1971

[21] Appl. No.: 178,950

[52] U.S. Cl. .............................. 210/322, 210/523
[51] Int. Cl. ........................................... B01d 21/18
[58] Field of Search ........... 210/523, 524, 526, 527, 210/531, 322

[56] References Cited
UNITED STATES PATENTS

| | | | |
|---|---|---|---|
| 996,624 | 7/1911 | Dorr | 210/523 X |
| 1,971,153 | 8/1934 | Coulter | 210/523 X |
| 2,191,743 | 2/1940 | Scott | 210/523 X |
| 1,292,237 | 1/1919 | Blomfield | 210/523 X |

*Primary Examiner*—Samih N. Zaharna
*Assistant Examiner*—T. A. Granger
*Attorney, Agent, or Firm*—Newton, Hopkins & Ormsby

[57] ABSTRACT

Apparatus for separating settled solids from liquid medium including a pair of juxtapositioned tank means constructed to include an inclined bottom having upright wall means for defining an upwardly open cavity area capable of containing predetermined amounts of liquid suspended solids and operable to permit solids to settle to the inclined bottom. Rake means, including a rake assembly operatively associated with each of the tank means, is provided for raking the settled solids upwardly along the inclined bottom for discharge through an opening defined in the inclined bottom. The rake assemblies are controlled through successive cycles of orbital movement whereby the rake assemblies are advanced along a first predetermined path adjacent the inclined bottom for effecting movement of the settled solids, elevated and advanced in an opposite direction along a predetermined path and thereafter lowered to position adjacent the inclined bottom at the start of a second cycle of operation. The rake assemblies include support means which will support and control movement of the rake assemblies in successive cycles of operation whereby one of the rake assemblies is advanced along said first predetermined path in a discharging direction while said other rake assembly is advanced along said second predetermined path in an opposite direction.

13 Claims, 9 Drawing Figures

INVENTORS:
WILLIAM A. CHAPMAN
NELSON SEVERINGHAUS

BY: Newton, Hopkins, & Ormsby
ATTORNEYS

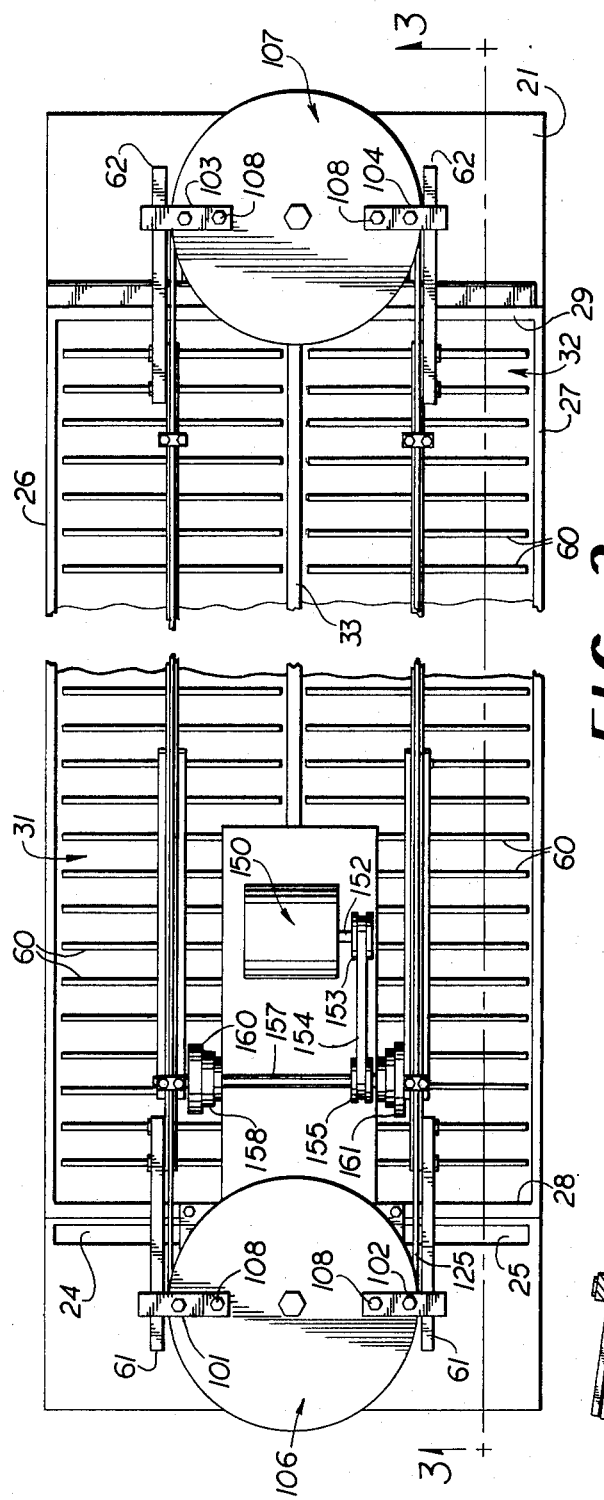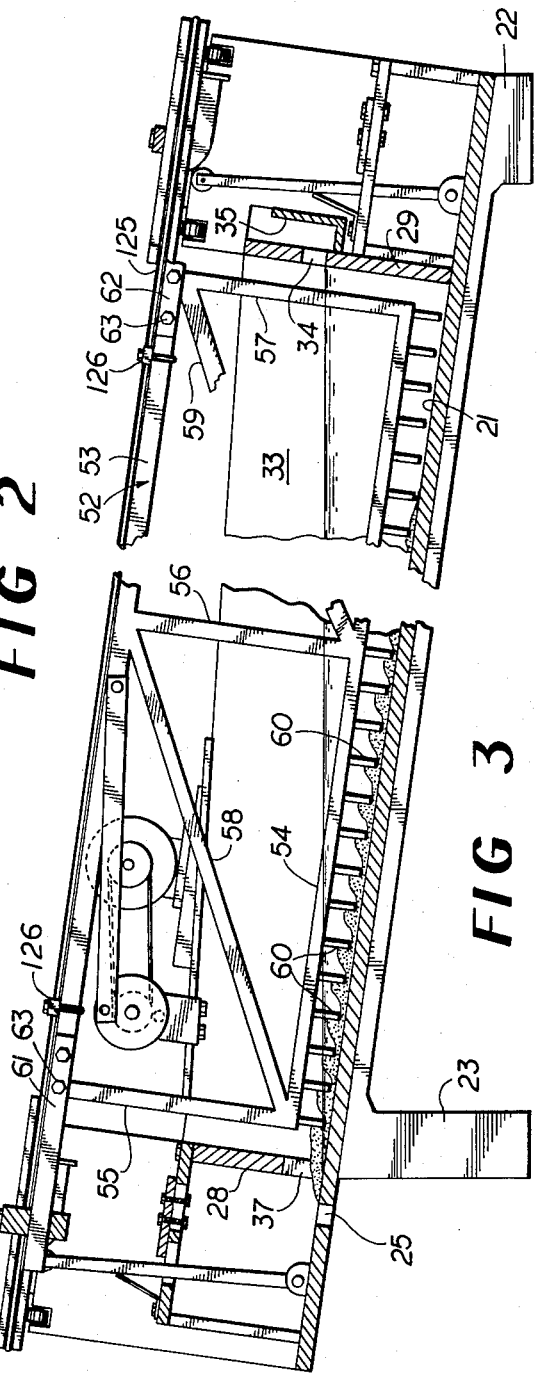

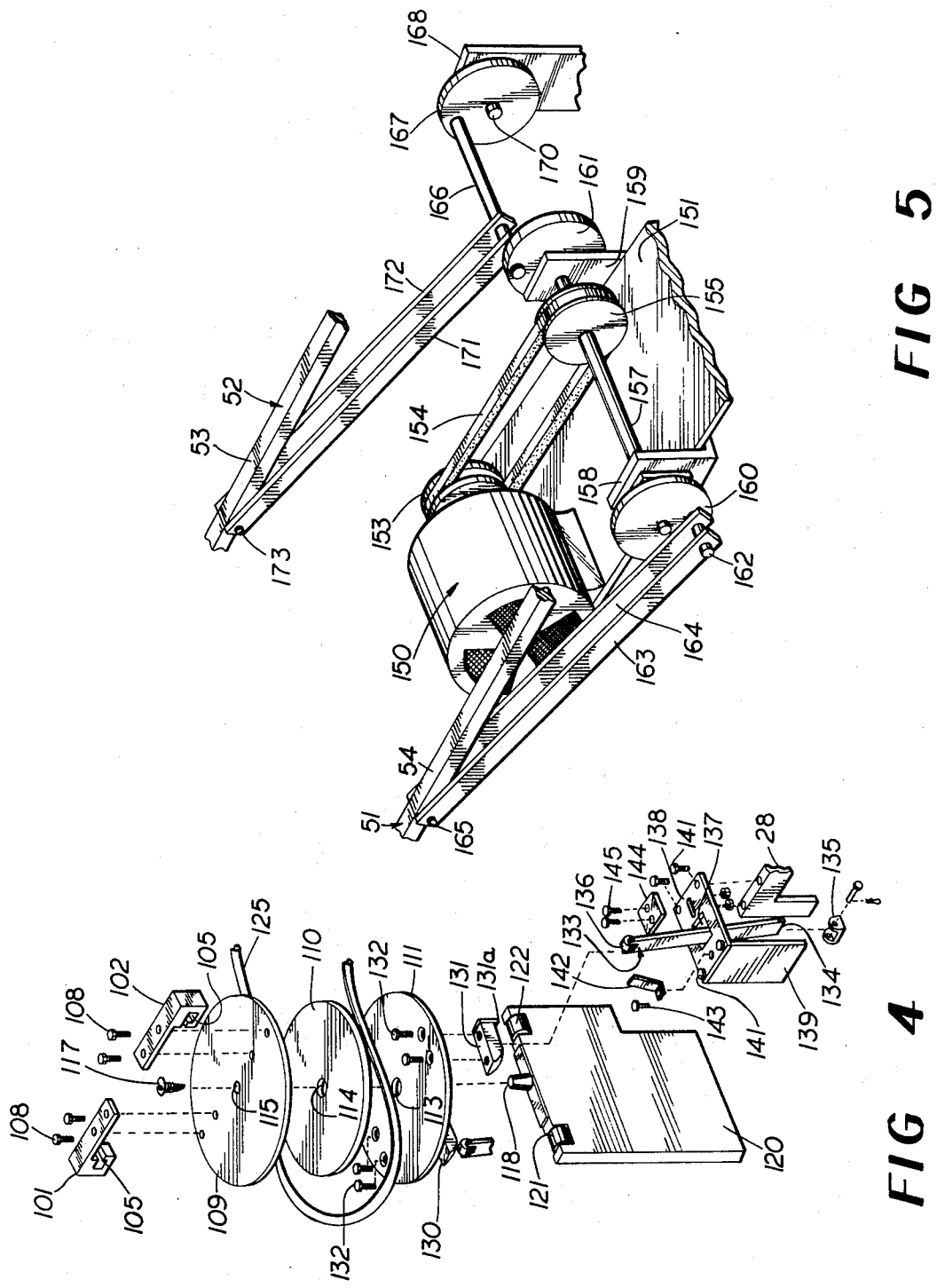

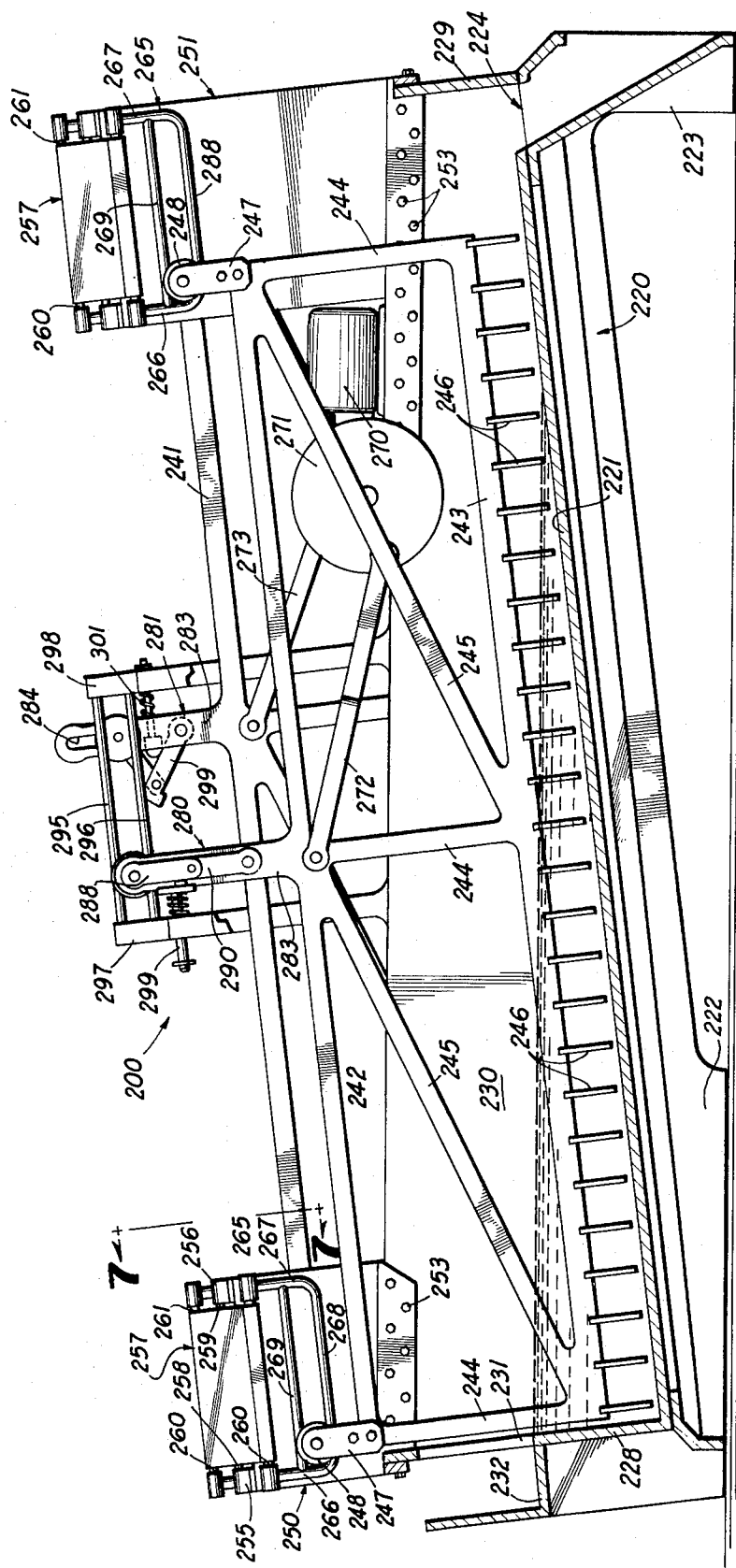
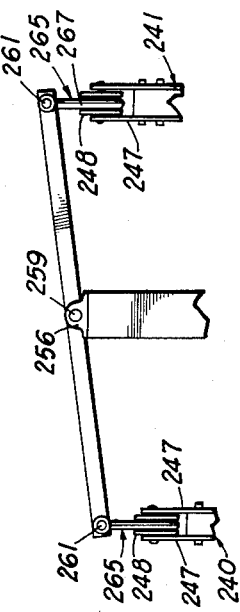
FIG 6
FIG 7

3,796,315

TWIN RAKE MECHANICAL CLASSIFIER

BACKGROUND OF THE INVENTION

This invention relates to classifier means to be used for separating settled solids from liquid medium such as in ore dressing, sand preparation and sewage disposal for sizing and dewatering.

In the processing of material such as sand, the sand is suspended in a liquid medium and is conveyed along a suitable conduit means into a sedimentation tank. After the sand has been received in the sedimentation tank, the sand is allowed to settle to the bottom and is advanced or moved along the bottom by suitable rake means for discharge into collection means or deposited on suitable conveyor means for transfer to a remote collection station.

In the processing of sewage, the liquid material containing solids is pumped or transferred along conduit means to sedimentation tanks. After the sewage material has been received in the sediment tanks, the solids are allowed to settle to the bottom and are then advanced or moved along the bottom for discharge through suitable openings. After the sewage material has been discharged through the openings, the solids are then moved to various other processing stations.

Still other types of classifiers which utilize sedimentation tanks and rake means for separating the settled solids therefrom include various types of ore processing operations, wherein the ore is transferred from a collecting point in liquid suspension to a sedimentation tank means wherein the ore is allowed to settle from the liquid and separated therefrom.

A number of attempts have been made to provide rake means operatively associated with sedimentation tanks for separating settled solids from the liquid medium. The prior art raking means are extremely complex, utilizing a number of power shafts, gears, cams and various other control elements. These prior art classifiers are extremely costly to manufacture and unreliable in performance, requiring considerable maintenance.

SUMMARY OF THE INVENTION

The above disadvantages of the prior art rake classifiers have been overcome by the present invention which basically includes a pair of juxtapositioned sedimentation tank means each having a rake assembly operatively associated therewith for a controlled movement through successive orbital cycles of operation. The sedimentation tank means includes an inclined bottom having a discharge opening and the rake assemblies are moved in successive cycles of operation through their orbital path wherein the rake means are advanced in a first direction along a first predetermined path adjacent the inclined bottom during a first portion of a cycle of operation and are elevated above the inclined bottom and advanced in a second opposite direction along a second predetermined path during an additional portion of a cycle of operation, with the cycle of operation being completed by lowering the rake assembly to position adjacent the inclined bottom to begin a second cycle of operation. During advancement of the rake assemblies along the first predetermined path adjacent the inclined bottom, settled solids located on the inclined bottom will be advanced upwardly therealong for discharge through the opening defined in the inclined bottom.

One important feature of the present invention resides in the support and control means for the rake assemblies which will permit one of the rake assemblies to be advanced along the first predetermined path while the other rake assembly is moved along the second predetermined path.

Another important feature of the present invention resides in the controlled movement of the rake assembly to produce an almost rectangular motion of the rakes, thus maintaining the pool agitation at a minimum to allow maximum settling and increased solids removable capacity.

Another important feature of the present invention resides in the location of the eccentric drive mechanism relative to the rake assemblies, wherein the eccentric drive is located for imparting a raising and lowering of the rakes in a cycle of operation, such that the lowering of the rakes by the eccentric drive helps maintain the rakes in close proximity to the inclined bottom during transfer of the material to the discharge openings.

The mechanical rake classifier of the present invention is constructed of two sets of rake assemblies which are suspended in balance, thus minimizing power and bearing loads required to raise and lower the assemblies.

A primary object of this invention is to provide a twin rake classifier which is simple in construction, economical to manufacture and reliable in performance.

Still other objects and advantages of the details of construction will become apparent upon reading the following description of the illustrative embodiment, with reference to the attached drawings wherein like reference numerals have been used to refer to like parts throughout the several figures, and wherein:

BRIEF DESCRIPTION OF THE FIGURES OF DRAWING

FIG. 2 is an enlarged fragmentary top plan view of the twin rake classifiers shown in FIG. 1;

FIG. 3 is a vertical sectional view taken along line 3—3 of FIG. 2, with parts broken away for purpose of clarity;

FIG. 4 is an exploded perspective view of one of the support and control elements used for controlling a rake assembly during orbital cycles of operation;

FIG. 5 is an enlarged fragmentary perspective view showing the motor and drive control means for the twin rake classifier shown in FIG. 1;

FIG. 6 is a vertical sectional view taken longitudinally through a modified form of the twin rake classifier embodying the principles of the present invention, with parts omitted and parts broken away for purpose of clarity;

FIG. 7 is a fragmentary elevational view taken along line 7—7 of FIG. 6;

DESCRIPTION OF THE ILLUSTRATIVE EMBODIMENT

Figure 1:
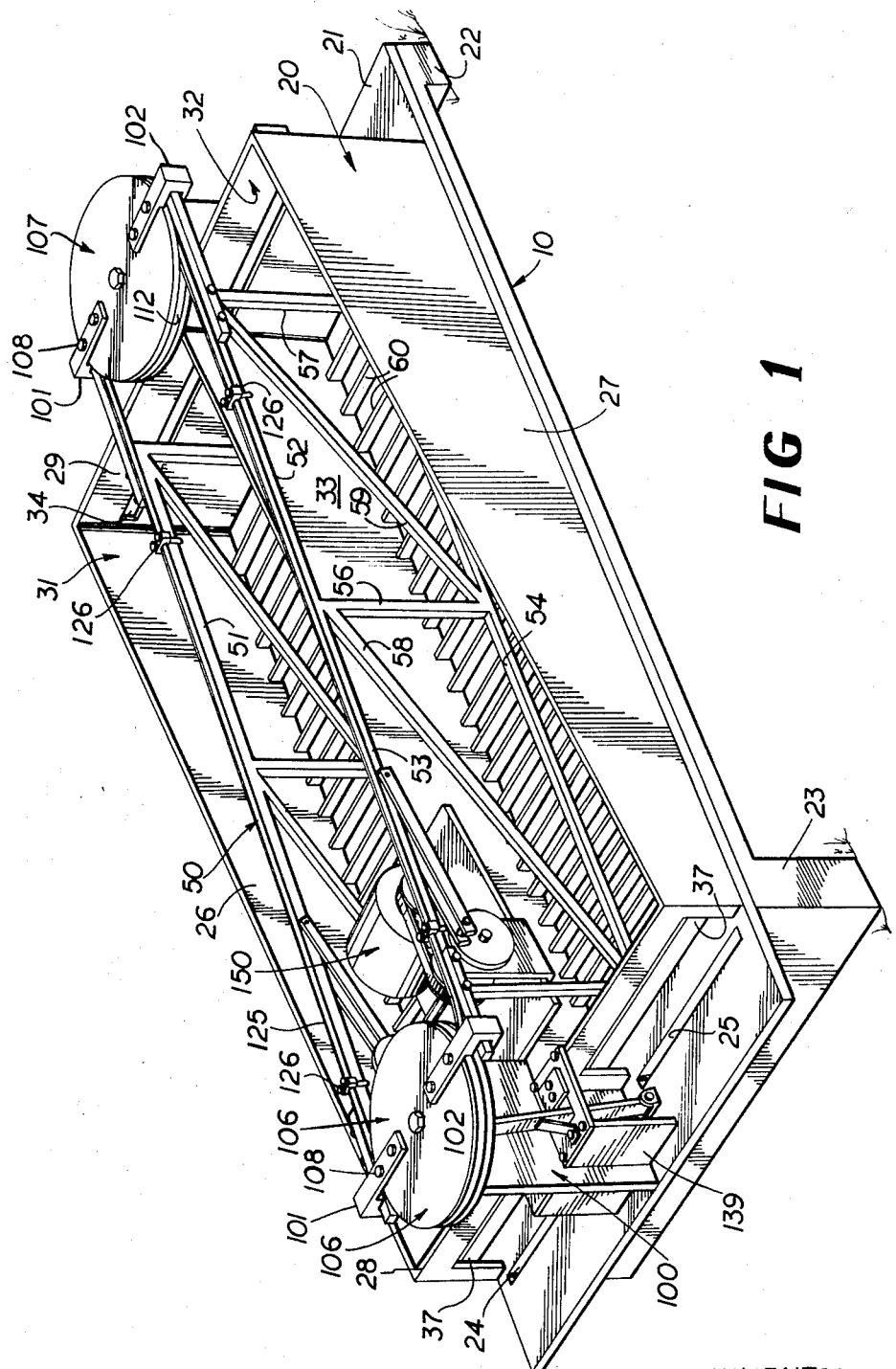
FIG. 1 is a perspective view of a twin rake classifier embodying the principles of the present invention.

Referring now to the drawings, the twin rake classifier embodying the principles of the present invention is generally represented by the reference numeral 10 and will be described with reference to sedimentation tank means 20, rake means 50, rake support and control means 100 and rake drive means 150.

The function of the sedimentation tank means 20 is to provide a pair of juxtapositioned tank elements which will contain predetermined amounts of liquid suspended solids introduced therein by suitable conveying means and which will allow the liquid suspended solids to settle to the bottom for separation from the liquid medium.

The function of the rake means 50 is to advance the settled solids along the bottom of the sedimentation tank means for discharge.

The function of the support and control means 100 is to provide effective means for supporting and controlling the rake means through orbital cycles of operation for performing the settled solids separating operation.

The function of the drive means 150 is to drive the rake means through successive cycles of orbital movement whereby a continuous operation of separating settled solids from liquid medium can be performed.

As shown in FIGS. 1–3, the sedimentation tank means 20 include a bottom member 21. Bottom member 21 is supported in an inclined relationship, as shown in FIGS. 2 and 3 by a first base support member 22 and a second base support member 23. Bottom 21 is provided with a pair of elongated openings 24, 25 located adjacent base support member 23. A pair of upright sidewall members 26, 27 are provided along opposite lateral side edges of the inclined bottom 21 and extend upwardly therefrom. Connected between opposite ends of the sidewalls 26, 27 are a pair of end wall members 28, 29. The tank means 20 is divided into a pair of juxtapositioned tanks 31, 32 by an intermediate upright wall member 33. Wall member 33 extends from end wall 28 to end wall 29. The inclined bottom 21 and upright wall members 26–29 will provide suitable means for containing predetermined amounts of liquid suspended solids. The liquid suspended solids are introduced into the tank elements 31, 32 by suitable conduit means (not shown).

As shown in FIGS. 1 and 3, an overflow opening 34 is provided in end wall 29. The overflow opening 34 is detailed in vertical location to allow liquid to flow outwardly therethrough prior to reaching an elevation which would permit the liquid to flow through the discharge openings 24, 25. A collection trough 35 is provided on the outside surface of end wall member 29 and positioned for collecting and conveying liquid passing through the overflow opening 34. End wall member 29 is provided with two openings 37, 38 located adjacent discharge openings 24, 25, respectively. Openings 37, 38 are detailed in location within end wall members 28 to provide a smooth surface for permitting settled solids to be transferred along the inclined bottom 21.

As shown in FIGS. 1–3, the rake means 50 includes a pair of rake assemblies 51, 52. The rake assemblies 51, 52 are supported whereby rake assembly 51 is in operative association with tank means 31 and rake assembly 52 is in operative association with tank means 32. Each of the rake assemblies 51, 52 are identical in construction and the component parts of each of the rake assemblies will be described concurrently with the same reference numeral applying to like parts on both of the rake assemblies. Each of the rake assemblies 51, 52 is constructed in the form of elongated truss-shaped structural member which includes an upper support beam 53, a lower support beam 54, a number of vertical connecting members 55, 56, 57 and a number of angle brace members 58, 59. The structural members 53-59 are constructed of suitable metal stock material with the connection points between the structured members being made by conventional welding means (not shown). The length of the truss-shaped structural rake assemblies 50, 51 are detailed in length to be slightly less than the elongated dimension of the tank means 31, 32, whereby the rake assemblies can be moved through oribital paths of movment within the tank means 31, 32, as will be described in more detail hereinbelow.

As shown in FIGS. 1 and 3, a plurality of rake elements 60 are secured to the bottom edge of lower structural beam 54. Rake elements 60 are oriented in substantially right angular relationship relative to structural member 54 and are detailed in dimensions to substantially fill the transverse dimensions between the sidewalls 26, 27 and the intermediate wall 33 whereby the rake elements 60 can effectively move settled solids on the inclined bottom throughout the lateral width of the tank means 31, 32. The rake members 60 are equally spaced along the longitudial axis of lower structural beam 54. As shown in FIGS. 1–3, the rake assembly upper structural beam 53 includes a pair of support arms 61, 62 extending from opposite ends thereof in substantially longitudinal alignment with structural beams 53. Support arms 61, 62 are connected to structural beams 53 by suitably threaded connecting means 63. The support arms 61, 62 are provided for supporting the rake assemblies 51, 52 for movement through the orbital cycles of operation, as will be described in more detail hereinbelow.

Support arms 61, 62 are supported within opening 105 (FIG. 4) provided in a number of guide members 101, 102, 103, and 104. Guide members 101-104 are connected to the upper surface of a pair of pulley-shaped support elements 106, 107. Guide members 101–104 are secured in position relative to the pulley-shaped support elements 106, 107 by suitably threaded connecting means 108. Pulleys 106, 107 are constructed of an upper plate member 109, an intermediate plate member 110 and a lower plate member 111. Plate members 109, 111 are of slightly larger diameter than plate member 110 to provide an angular groove 112 defined therearound for receiving a cable support member, as will be described in more detail hereinbelow.

The plate members 109-111 are secured in position relative to each other by the threaded connecting bolts 108 which extend through threaded openings provided in each of the plate members 109-111. Pulley shaped support elements 106, 107 are supported for pivotal movement about a substantially vertical axis by an upstanding pivot support member 118. Pivot support member 118 is inserted through an opening 113 in plate member 111, opening 114 in plate member 110, and the upper edge of the pivot support member 118 is in abutting contact with the lower surface of plate support member 109. Openings 113, 114 are detailed in dimensions to rotatably receive pivot support member 118. Plate member 109 is provided with an opening 115 which is much smaller in diameter than the openings 113, 114 and will not permit the pivot support member 118 to extend therethrough. The upper edge of pivot support member 118 will be in abutting contact with support plate member 109 and will be retained thereon by conventional threaded connected means 117. Pivot support member 118 is secured to the upper surface of vertical frame elements 120. Frame elements 120 are secured to and extend from bottom wall 21 upwardly adjacent the outside surface of end walls 28, 29. Frame members 120 are substantially coplanar aligned with the intermediate wall member 33.

As shown in FIGS. 3 and 4, the upper edge of frames 120 are provided with a pair of radially spaced rollers 121, 122. Rollers 121, 122 are coaxially aligned relative to each other and provide a means for pivotally supporting pulley-shaped support elements 106, 107. The pivot support stud members 118 will support plate elements 106, 107 for pivotal movement about the vertical axis of the stud elements and the dimension of the stud elements are detailed relative to openings 113, 114 to permit pivotal movement of the support elements 106, 107 about a substantially horizontally aligned axis, with the rollers 121, 122 providing a pivot support means for the horizontal axis. The horizontal axes are coplanar aligned with the vertical axis of pivot stud members 118.

The rake assemblies 51, 52 are supported by the longitudinally extending arms 61, 62 which extend through openings 105 defined in guides 101, 102. Rake assemblies 51, 52 are drivingly connected to the support elements 106, 107 by an endless cable 125. The endless cable 125 is secured to the upper surface of upper structural beam members 53 by a plurality of conventional clamp elements 126. Endless cable 125 passes along the upper surface of beams 53 and is fitted around annular grooves 112 defined in support elements 106, 107. The connection of cable 125 with the support elements 106, 107 will permit the rake assemblies 51, 52 to transfer reciprocating movement of the rake assemblies into pivotal oscillating movement of the support elements 106, 107. The cable suspension means 125 for the rake assemblies including clamp elements 126 will permit readily removal of the rake assemblies for repair or replacement of one rake element. The cable suspension means 125 will also support the rake assembly whereby the rake assemblies will be advanced in a substantially common plan during movement through the orbital cycles of operation.

Each of the rake assemblies 50, 51 including the support and control means are suspended in balance, thus minimizing the power and bearing loads required to effect the continuous cycles of operation of the rake assemblies.

As shown in FIGS. 1, 3 and 4, the pivot support elements 106, 107 are controlled for selected pivotal movement about the horizontal axis of pivot support rollers 121, 122 by a cam control means which includes a pair of cam elements 130, 131. Cams 130, 131 are attached to the bottom surface of each of the pulley-shaped support elements 106, 107 by threaded connecting members 132, which are inserted through complementary openings within the plate members and threadably received by complementary threaded openings provided in cam elements 130, 131. Cam elements 130, 131 will effect displacement of the pulley-shaped support elements 106, 107 about the horizontal axis defined by rollers 121, 122. Vertical displacement of cam elements 130, 131 is effected by means of a cam displacement lever 133. A cam displacement lever 133 is operatively associated with each of the cam elements 130, 131. Each of the cam displacement levers 133 includes an elongated link member 134 pivotally attached at its lower end by a bracket member 135 to tank floor 21. A cam engaging roller 136 is supported for rotation in the upper extended end of each of the link members 134 for contacting and rotatably engaging cam elements 130, 131. The elongated link members 134 extend through slots 137 provided in horizontal plate members 138. Plate members 138 are supported in vertically spaced relationship above floor 21 by upstanding support brackets 139 and end walls 28, 29. Plate members 138 are secured in a fixed position by conventional threaded connecting members 141.

As shown in FIGS. 1 and 4, levers 134 are spring biased in a clockwise direction by leaf springs 142. The leaf springs 142 are secured to the upper surface of plates 138 by a conventional threaded connecting member 143. Adjustable limit stop plates 144 are attached to support plates 138, on an opposite side of the cam displacement lever from leaf springs, and secured in selectively adjustable positions thereon by conventional threaded connecting means 145. The limit stop plates 144 will permit selective adjustment of the extent of clockwise movement of the cam displacement support levers 134, to thereby control the timed relationship of displacement of the cams 130, 131. Operational control of the pulley-shaped support elements 106, 107 by the cam elements 130, 131 will be described in more detail hereinbelow in the description of operation of the twin rake mechanical classifier.

The operation of the cams 130, 131 and the cam displacement members 133 will control the movement of the rake assemblies in a cycle of operation which is almost rectangular in motion to give a minimum pool agitation thus allowing maximum settling and increased solid removal capacity.

The rake assemblies 51, 52 are driven through successive orbital cycles of operation by a power motor means 150. Power motor means 150 is supported on a horizontal plate member 151. Plate member 151 is secured to the upper surface of intermediate wall member 33 adjacent end wall member 28. Motor means 150 is secured to plate member 151 by conventional adjustable connecting means (not shown).

As shown in FIG. 2, the motor means 150 includes a conventional power operable drive shaft 152. Shaft 152 supports a drive pulley 153 for driving belt 154. At opposite end of belt 154 is in driving engagement with pulley 155. Pulley 155 is fixed to a cross control shaft 157. Shaft 157 is journaled for rotation in a pair of upstanding support brackets 158, 159. Brackets 158, 159 are secured to the lateral side edges of motor support plate 151. Shaft 157 extends through the support brackets 158, 159 with the extended ends thereof drivingly supporting crank members 160, 161. Crank member 160 includes a radially displaced crank pin 162. Crank pin 162 is connected to one end of a pair of elongated link members 163, 164. Opposite ends of link members 163, 164 are connected by pin connecting means 165 to the upper beam 53 of rake assembly 51. Rotary crank member 161 is provided with a crank pin 166 radially displaced from the axis of the crank member 161. As shown in FIG. 5, a pair of elongated driving link members 171, 172 are connected adjacent one end to crank pin 166. Opposite ends of link members 171, 172 are connected to a pivot connecting pin 173. Pin 173 is fixed to the upper support beam 53 of rake assembly 52.

As shown in FIG. 5, crank pins 162 and 166 are substantially 180° radially displaced relative to the axis of the rotary crank members 160, 161. The radial displacement of crank pins 162, 166 will effect a driving movement of rake assembly 51 in one direction while driving rake assembly 52 in an opposite direction and thereafter automatically reversing the direction of operations of the rake assemblies 51, 52.

The location of the crank members 160, 161 below the upper beam 53 of the rake assemblies will operate to pull the connecting links and rake members downwardly during one portion of the cycle of operation, to insure that the rake elements 160 are maintained in close proximity to the inclined bottom to provide maximum raking action of the raking elements. The location of the crank members 160, 161 will impart an upward movement of the rake assemblies during an additional portion of the cycle of operation to aid in lifting the rake assemblies to the upwardly displaced position.

Figure 9:
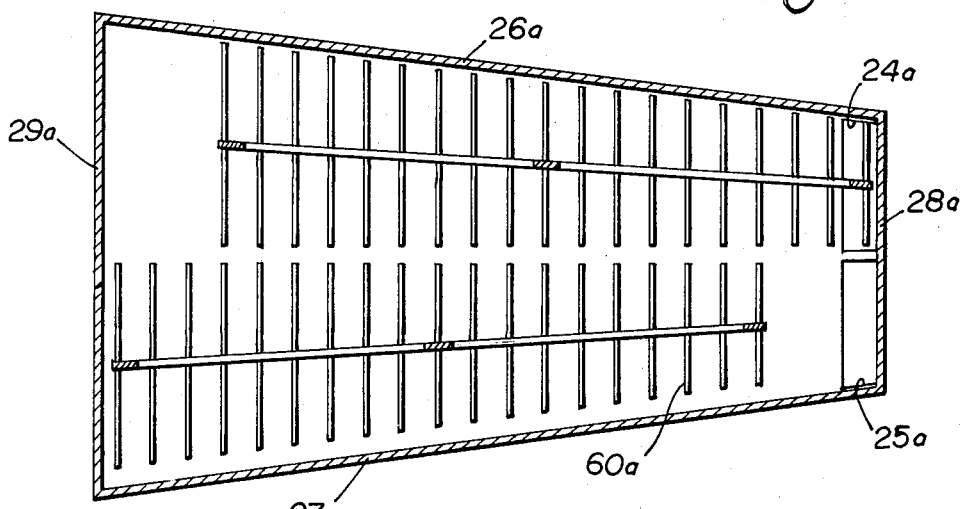

A modified tank construction is shown in FIG. 9 wherein the side walls 26a, 27a diverge outwardly away from discharge openings 24a, 25a and toward end wall 29a. The diverging walls 26a, 27a will increase the sedimentation area of the tank means without substantially increasing the rake assembly construction. In using a diverging wall construction, the rake elements 60a will be gradually increased in length as they approach end wall 29a. Sufficient clearance is provided between the rake elements and the wall construction to permit the required cyclic operation. The support for the rake assemblies adjacent end wall 29a would be slightly larger than the support adjacent end wall 28a.

OPERATION

In utilizing the twin rake classifier embodying the principles of the present invention, the classifier is supported in a position substantially as shown in FIG. 3 and a supply of liquid suspended solids is introduced into each of the tank members 31, 32. The supply of liquid suspended solids is introduced by conventional conduit means (not shown). The amount of liquid suspended solids can be gradually introduced or can be introduced at prescribed amounts. Excess liquid introduced into the tank means will overflow through openings 34 into the collection trough 35. Solids contained within the tank members 131, 132 will be allowed to settle to the inclined bottom surface 21.

In operation of the twin rake assemblies 51, 52, motor means 150 is energized thereby effecting rotary movement of control shaft 157 through the pulley and belt drive means 153-155. Rotary movement of control shaft 157 will effect movement of the rake assemblies 51, 52. A clockwise rotation of control shaft 157 will effect movement of rake assembly 52 rightward and at the same time will effect movement of the rake assembly 51 leftward. Since the rake assemblies 51, 52 are supported and frictionally engaged with the pulley support elements 106, 107, movement of the rake assemblies 51, 52 will effect oscillating movement of pulley-shaped support members 106, 107 about the vertical axes of pivot supports 118. An oscillating movement of the pulley-shaped support members 106, 107 will also effect displacement of cams 130, 131. Referring now particularly to FIG. 3, displacement of rake assembly 52 to the left will cause the pulley-shaped support members 106, 107 to move clockwise (FIG. 2). A clockwise movement of the pulley-shaped support members 106, 107 will cause cam members 131 to move to the left and contact cam displacement lever rollers 136. As cams 131 contact rollers 136, the cams will effect a displacement of the elongated supported levers 134 until the levers contact the left edge of slots 137. After levers contact the left edge of slots 137, the cam will then advance over rollers 136. Advancement of cams 131 over rollers 136 will elevate the cams to thereby pivot the pulley-shaped support members 106, 107 about the horizontal axis defined by guide rollers 121, 122. Pivotal displacement of the pulley-shaped support members 106, 107 about a horizontal axis will elevate rake assembly 52. The driving displacement of the rotary crank pin 166 is detailed such that as soon as the rake assembly 52 has been elevated the crank pin will then reverse direction of the rake assembly to move the rake assembly to the right, as shown in FIG. 3.

As soon as the cams 131 have been moved to a position above rollers 136, the leaf spring means 142 will effect movement of the rollers to the right until rollers 136 contact a stop member 131a located on the right edge of cams 131. During displacement of the rake assembly 52, to the right by the rotary driving crank pin 166, the pulley shaped support members 106, 107 will be moved counterclockwise (FIG. 2). Cams 131 are detailed in design to maintain rake assembly 52 in an elevated position until the rake assembly 52 reaches the right most driven position by crank pin 166. As soon as the driving crank pin 166 advances the rake assembly 52 to the rightward limit position, as shown in FIG. 3, the elongated levers 134 supporting rollers 136 will contact the limit stop plate 144 to thereby prevent any further movement of rollers 136, allowing the cams 132 to be displaced therefrom, to permit the rake assembly 52 to be lowered into position adjacent inclined bottom wall 21. A continued rotation of rotary driven crank member 166, will then advance the rake assembly 52 to the left, with the rake elements 60 supported adjacent the inclined bottom wall 21. Movement of rake elements 60 to the left while in position adjacent the inclined bottom wall 21, will effect displacement of settled solids to the left. A continued movement of rake assembly 52 to the leftmost driven position by crank pin 166, will again effect engagement of cams 131 with rollers 136 for vertical displacement of the supporting pulleys 106, 107 and rake assembly 52.

The above described displacement of the rake assembly 52 will be driven through an orbital cycle of operation wherein the rake elements 60 are advanced in a first predetermined path adjacent bottom wall 21 and in a direction toward discharge opening 25. After the rake assembly 52 reaches the leftmost position, the cam displacement rollers 136 will elevate the rake element 60, and cams 131 will maintain the rake elements 60 in an elevated position while advancement in a second opposite direction along a second predetermined path substantially parallel to the first predetermined path and substantially parallel to the inclined bottom wall 21. During a completion of the orbital cycle of operation, cams 131 will operate to lower the rake elements 60 into position again adjacent bottom wall 21. Motor drive means 150 is continuously driven and will effect successive cycles of orbital operation of rake assembly 52 to advance the settled solids along the inclined bottom 21 for discharge through opening 25.

Since the rake assembly 51, operatively associated with tank means 31, is connected and is driven simultaneously with rake assembly 52, the control cams 130 will effect a corresponding control movement of rake assembly 51 through sucessive orbital cycles of operation to thereby separate the settled solids contained in tank 31, for discharge through opening 24. Since the rake assemblies 51, 52 are drivingly connected at substantially 180° angularly displaced with drive control shaft 157, the rake assembly 51 will be driven through one portion of an orbital cycle while the rake assembly 52 is being moved through an opposite portion of the orbital cycle of operation.

The rotary driven crank pins 162, 166 are detailed in their driving displacement for effecting advancement of the rake assemblies 51, 52 along the first predetermined path from a position adjacent end wall 29 to a displaced position adjacent end wall 28 and for return movement along the second predetermined path to a position adjacent end wall 29.

MODIFICATION OF THE RAKE ASSEMBLY SUPPORT AND CONTROL MEANS

Figure 8:
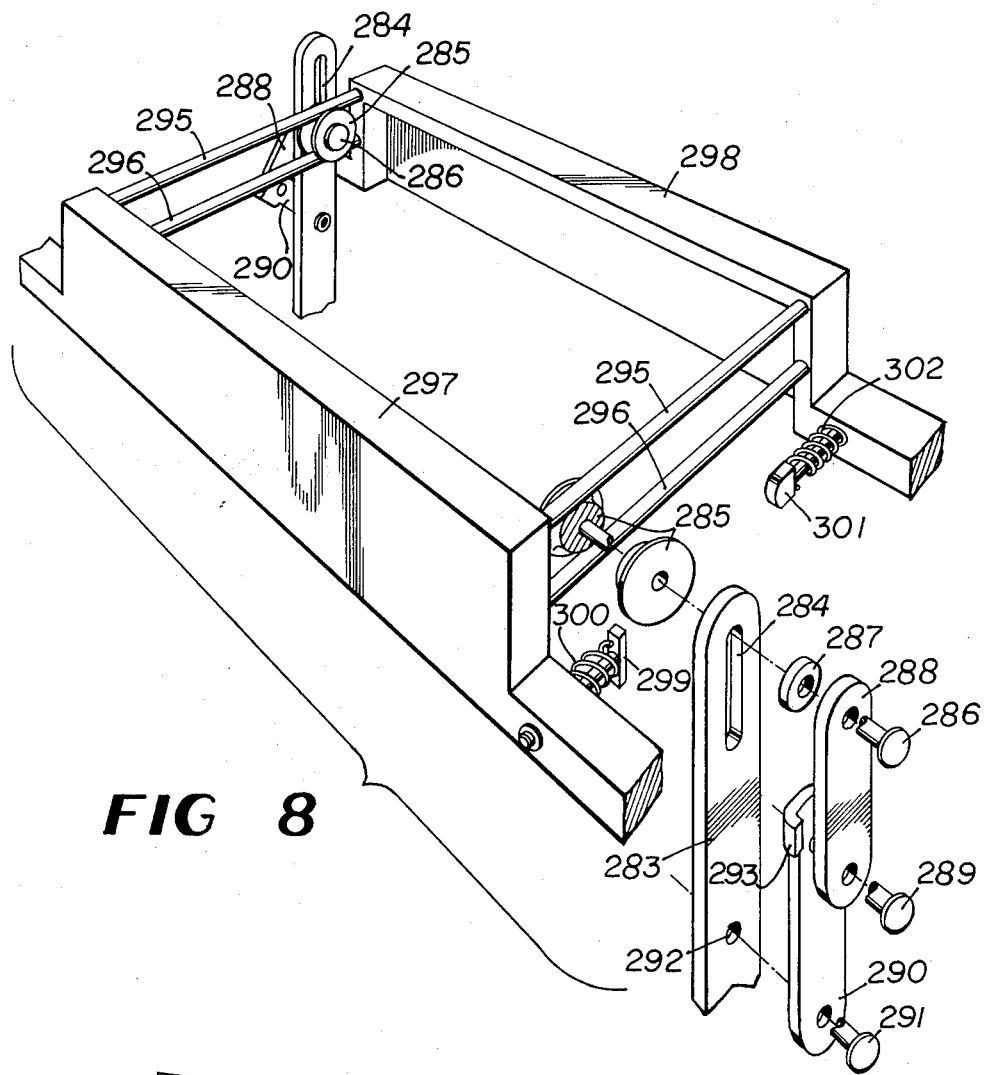
FIG. 8 is an enlarged exploded perspective view showing the details of construction of the linkage control assemblies utilized in the twin rake classifier modification of FIGS. 6 and 7; and, FIG. 9 is a schematic plan view illustrating a further modification of the twin rake classifier tank means showing a flared side wall means.

Referring now particularly to FIGS. 6–8, a modified rake assembly support and drive means is shown and generally represented by the reference numeral 200. The modifications shown in FIGS. 6–8 include a sedimentation tank means 220 similar in construction to tank 20 shown in FIGS. 1–5. Tank 220 includes a bottom member 221 supported in an inclined relationship by first and second base support member 222, 223. Bottom 221 is provided with a discharge opening means 224 adjacent base support member 223. The tank means 220 includes a pair of upright sidewall members (not shown) provided along opposite lateral side edges of the inclined bottom 21 and extending upwardly therefrom. Connected between the opposite ends of the sidewalls are a pair of endwall members 228, 229. Tank means 220 is divided into a pair of juxtapositioned tanks in the same manner as described above in regard to tank 20 and includes an intermediate wall member 230. Wall member 230 extends from endwall 228 to endwall 229.

As shown in FIG. 6, an overflow opening 231 is provided in endwall 228. Overflow opening 231 is detailed in vertical location to allow liquid to flow outwardly into a discharge trough means 232. Trough 232 is provided on the outside of endwall 228 and positioned for collecting and conveying overflow liquid passing through opening 231.

As shown in FIGS. 6 and 7, the sedimentation tank means 220 includes a pair of rake assemblies 240, 241. The rake assemblies 240, 241 are supported in operative association with the sedimentation tank means 220. Each of the rake assemblies 240, 241 is similar to the rake assemblies 50, 51 described hereinabove. Each of the rake assemblies is constructed in the form of elongated truss-shaped structural member having an upper support beam 243, a number of vertical extending connecting members 244 and a number of angle brace members 245. A plurality of rake elements 246 is secured to the bottom edge of lower structural beam 243.

As shown in FIGS. 6 and 7, each of the rake assemblies 240, 241 includes a support bracket 247 extending vertically upward from opposite ends of the rake assemblies. The upper extended ends of the support brackets 247 are provided with roller support members 248.

As shown in FIGS. 6 and 7, the rake assemblies 240, 241 are supported adjacent their opposite ends by support assemblies 250, 251. Each of the support assemblies 250, 251 is secured in vertically oriented relationship to the upper edge of the intermediate wall member 230. The support assemblies 250, 251 are secured to the intermediate wall by conventional threaded connecting elements 253. Each of the support assemblies includes a vertically extending support standard 254. Support standards 254 provide a pair of horizontally spaced coaxially aligned bearing members 255, 256. Bearing members 255, 256 provide means for pivotally supporting transverse support plates 257. The support plates 257 include horizontally extending pivot members 258, 259 which are journaled within the bearing members 255, 256, respectively. Opposite ends of the plates 257 are provide with coaxially aligned horizontally extending pivot elements 260, 261. Pivot elements 260, 261 provide a pivot support means for hanger brackets 265. Hanger brackets 265 are of substantially U-shaped construction and include base 268 and a pair of upstanding legs 266, 267. Base 268 privides a guide track means for supporting rollers 248. A second track member 269 is secured between legs 266, 267 in substantially parallel relationship relative to base member 268 and defines therebetween a track for engaging and retaining the support roller 248.

The above described support assemblies 250, 251 provide means for supporting the support plate 257 for pivotal movement about the axis of bearing members 255, 256 and the hanger brackets 255 provide track means for permitting rolling displacement of the rake assemblies. The pivot support members 260, 261 will permit the hanger brackets 265 to pivot relative to the plate support member 257 whereby the hanger brackets are maintained in a vertically oriented position. The track elements 268, 269 are detailed in substantially parallel relationship relative to the tank bottom 221 whereby the rake assemblies 240, 241 can be moved in parallel relationship relative to the tank bottom in a cyclic operation for advancing the settled particles of material outwardly through the discharge opening 24, as will be described in more detail hereinbelow.

As shown in FIG. 6, the rake assemblies 240, 241 are driven in cycles of raking movement relative to the support tracks 268, 269 by means of a power motor means 270. The power motor means 270 is supported above intermediate wall member 230 and includes a conventional gear box and power drive shaft (not shown). Secured to opposite ends of the power drive shaft are a pair of rotary crank members 271 (only one of the crank members has been shown in FIG. 6 however, it is to be understood that a second rotary crank member would be provided on an opposite side of the drive shaft extending from the gear box). One of the cranks 271 is connected by a driving link means 272 to the rake assembly 240. The opposite rotary crank 271 is connected by a driving link member 273 to the rake assembly 241. The rotary crank members 271 are connected in fixed angular offset relationship to the power drive shaft whereby the link elements 272, 273 are 180° angular displaced relative to each other. The above described relationship will effect movement of one of the rake assemblies in one direction while moving the other rake assembly in an opposite direction. The motor drive means 270 will effect continuous cycles of operation of the rake assemblies 240, 241 in a similar manner as described above in regard to the embodiment shown in FIGS. 1–5.

Vertical displacement of the rake assemblies 240, 241 from a position adjacent the tank bottom 221 to an elevated position, is controlled by a pair of linkage control assemblies 280, 281 with one of the linkage assemblies being connected, respectively, to an intermediate portion of each of the rake assemblies 240, 241 and extend vertically above the rake assemblies.

As shown in FIG. 8, each of the linkage assemblies includes a main control link 283. The main control links 283 are connected in fixed relationship relative to the rake assemblies 240, 241. The upper extended ends of the main control link 283 include elongated slot means 284. Slot means 284 provides a support track for slidably supporting control rollers 285. Rollers 285 are rotatably mounted on support shafts 286. Support shafts 286 extend through the rollers 285, through the elongated slots 284, through a spacer element 287 and through first movable control links 288. The first movable control links 288 are pivotally connected adjacent their lower ends by pivot members 289 to second control links 290. Second control links 290 are pivotally secured by pivot elements 291 to a lower displaced portion of the main control link 283. The pivot support members 286, 289, 291 are secured in an assembled relationship by conventional retaining means (not shown). The upper extended ends of the second control links 290 are provided with limit stop members 293. The limit stop members 293 will engage lateral edges of first control links 288 to limit the amount of counterclockwise movement of first control links 288 and to limit the amount of clockwise movement of second control links 290.

As shown in FIGS. 6 and 8, rollers 285 are supported in rolling engagement with a pair of vertically spaced track elements 295, 296. Track elements 295, 296 are detailed in vertical spacing to define guide track means which will permit horizontal displacement of the rollers 285 and rake assemblies 240, 241. The guide track elements 295, 296 are secured at their opposite ends to a pair of horizontally extending transverse support frame elements 297, 298. The oppositely extended ends of the frame elements 297, 298 are secured to an intermediate portion of the sidewall members of the sedimentation tank means 220. The frame elements 297, 298 are supported in vertically spaced position above the rake assemblies and detailed in location whereby the linkage assemblies 280, 281 will extend upwardly through the frame elements 297, 298 with the lateral space therebetween in detail to permit the required amount of reciprocating movement of the rake assemblies 240, 241 in a cycle operation.

As shown in FIGS. 6 and 8, the frame support elements 297 include a control element 299 associated with each linkage assembly. Control elements 299 are slidably supported by frame element 297 and are urged to the right as shown in FIG. 8 by a compression spring 300. Control elements 299 are detailed in location to contact the control links 288, 290 when they are moved to an extreme left position, as shown in FIG. 6, to effect movement of the links to their extreme extended clockwise and counterclockwise directions of movement until the limit stop members 293 contact control link 288. A second control element 301 is slidably supported by the frame element 298 adjacent each of the linkage assemblies. Control element 301 is urged to the left as shown in FIG. 8, by compression spring 302. The control element 301 is detailed in location relative to linkage assemblies 280, 281 whereby the control element 301 will contact control links 288, 290 and effect movement of the control links to a collapsed position.

Referring now particularly to FIG. 6, the rake assembly 240 is advanced to the right by a counterclockwise rotation of crank element 271. Movement of the rake assembly 240 to the right will effect displacement of roller 285 along the tracks 295, 296. Prior to movement of the crank element 271 to an extreme rightward position, the linkage control elements 288, 290 will contact the control element 301, which will pivot the control links to a collapsed position, away from their extended limit position. As the links 288, 290 are moved to the collapsed position, the roller support shaft 286 will be displaced downwardly to the lower edge of guide slot 284. Movement of the shaft 286 downward within slot 284 will permit an upward displacement of the rake assembly 240. The above described movement of the linkage control assembly 280 will be effected simultaneously with an opposite controlled movement of the linkage control assembly 281 to an extended position. Since the rake assemblies 240, 241 are connected in 180° angularly offset driving relationship, the rake assembly 241 will be advanced to the left simultaneously with rightward movement of rake assembly 240. During a leftward displacement of the rake assembly 241, the control links 288, 291 will be maintained in the collapsed position, as shown in FIG. 6. A continued leftward displacement of the rake assembly 241 will cause the control links 288, 290 to contact the first control element 290. A continued leftward movement of the rake assembly 241 will cause control element 290 to move the control links 288, 291 to their extended limit position. With the links 288, 291 in their extended limit position, the links will be longitudinally aligned relative to each other. As the links 288, 290 move to their extended limit position, the roller support shaft 286 will be displaced upwardly in slot 284. An upward displacement of roller 285 will effect a downward displacement of the rake assembly 241 to move the rake assembly into position adjacent the inclined bottom 221.

The control elements 299, 301 for each of the linkage control assemblies are detailed in their location to contact and effect movement of the linkage control elements between their extended limit position and their collapsed position such that the rake assembly 240 will move upward with a simultaneous downward displacement of rake assembly 241 and vice versa.

It now becomes apparent that the above described illustrative embodiment of a twin rake mechanical classifier is capable of obtaining the above stated objects and advantages. It is obvious that those skilled in the art

What is claimed is:

1. Apparatus for separating settled solids from liquid medium comprising, in combination:
  a. a pair of juxtapositioned tank means, each of said tank means including an inclined bottom with upright wall means for defining an upwardly open cavity area capable of containing predetermined amounts of liquid suspended solids, wherein said solids are permitted to settle to said inclined bottom, and wherein an upper edge of said inclined bottom defines an opening for permitting solid particles to be discharged therethrough;
  b. a pair of rake assemblies, each rake assembly including a plurality of rake elements supported thereon, and wherein one of said rake assemblies is operatively associated with each of said tank means for moving said settled solids along said inclined bottom for discharge through said opening in response to movement of said rake elements along a first predetermined path adjacent said inclined bottom and in a first direction toward said discharge opening;
  c. means for supporting said rake assemblies for movement through successive cycles of operation wherein said rake elements are advanced along said first predetermined path adjacent said inclined bottom of each of said tank means, with the rake elements moving in said first direction during a portion of a cycle of operation, said rake elements being displaced above said inclined bottom and advanced in a second opposite direction along a second predetermined path during an additional portion of a cycle of operation and with said rake elements being lowered to said position adjacent said inclined bottom during a completion of a cycle of operation, said supporting means including a support element oscillatably movable about a substantially vertically oriented axis, with said rake assemblies being supported by said support element such that said rake elements are moved along said first and second paths of said cycle of operation during said oscillating movement of said support element, cam means operatively associated with said support element for effecting movement of said support element about a substantially horizontally oriented axis whereby said rake elements can be displaced from said inclined bottom and can be lowered to position adjacent said inclined bottom under control of said cam means during portions of said cycle of operation;
  d. control means operatively associated with said rake assemblies for effecting movement of said rake elements through successive cycles of operation whereby solid particles settled to said inclined bottom can be advanced therealong and discharged through said discharge opening; and
  e. said means for supporting said rake assemblies including a number of oscillatably operable support elements longitudinally spaced along said rake assemblies for supporting and controlling said rake means through said orbital cycles of operation, each of said support elements including said cam means and said cam control element, and each support element being a pulley having an annular groove.

2. Apparatus as in claim 1 wherein an endless cable is passed around the grooves of two of said pulleys and said rake assemblies are attached to and supported by said cable, whereby movement of the rake assemblies through their cycles will effect oscillation of said cables.

3. Apparatus as in claim 2 wherein the horizontal axes about which said support elements are movable are provided by maintaining said elements on the upper horizontal edges of vertically positioned, plate-like frame members, said edges having upstanding pins which provide said vertically oriented axes, said support elements being provided with openings in which said pins are received.

4. Apparatus as in claim 3 wherein said edges of said frame members are provided with rollers on which said support elements rest, said rollers providing the horizontal axes about which said support elements are movable.

5. Apparatus for separating settled solids from liquid medium comprising, in combination:
  a. a pair of juxtapositioned tank means, each of said tank means including an inclined bottom with upright wall means for defining an upwardly open cavity area capable of containing predetermined amounts of liquid suspended solids, wherein said solids are permitted to settle to said inclined bottom, and wherein an upper edge of said inclined bottom defines an opening for permitting solid particles to be discharged therethrough;
  b. a pair of rake assemblies, each rake assembly including a plurality of rake elements supported thereon, and wherein one of said rake assemblies is operatively associated with each of said tank means for moving said settled solids along said inclined bottom for discharge through said opening in response to movement of said rake elements along a first predetermined path adjacent said inclined bottom and in a first direction toward said discharge opening;
  c. means for supporting said rake assemblies for movement through successive cycles of operation wherein said rake elements are advanced along said first predetermined path adjacent said inclined bottom of each of said tank means, with the rake elements moving in said first direction during a portion of a cycle of operation, said rake elements being displaced above said inclined bottom and advanced in a second opposite direction along a second predetermined path during an additional portion of a cycle of operation and with said rake elements being lowered to said position adjacent said inclined bottom during a completion of a cycle of operation, said supporting means including a support element oscillatably movable about a substantially vertically oriented axis, with said rake assemblies being supported by said support element such that said rake elements are moved along said first and second paths of said cycle of operation during said osciallating movement of said support element, cam means operatively associated with said support element for effecting movement of said support element about a substantially horizontally oriented axis whereby said rake elements can be displaced from said inclined bottom and can be lowered to position adjacent said inclined bottom under control of said cam means during portions of said cycle of operation;

d. control means operatively associated with said rake assemblies for effecting movement of said rake elements through successive cycles of operation whereby solid particles settled to said inclined bottom can be advanced therealong and discharged through said discharge opening; and e. said support element extending on opposite sides of said vertically oriented axis and said rake assemblies being supported on said support element on opposite sides of said vertically oriented axis respectively, and said horizontally oriented axis intersecting said vertically oriented axis and extending substantially parallel to the paths of movement of said rake assemblies.

6. Apparatus for separating settled solids from liquid medium as defined in claim 5 further characterized in that said tank means includes outwardly diverging sidewall means extending away from said discharge opening whereby said diverging sidewall means will increase the capacity of the sedimentation area of said tank means to furnish maximum settling capacity with minimum amount of raking mechanism.

7. Apparatus for separating settled solids from liquid medium as defined in claim 5 further characterized in that said rake means and said rake support means are detailed in construction such that said rake means are suspended in balance, thus minimizing the power and bearing loads required.

8. Apparatus for separating settled solids from liquid medium as described in claim 5 further characterized in that a control element is operatively associated with said cam means and said oscillatably operable support element for effecting vertical displacement of said support element about said substantially horizontally oriented axis, and wherein said cam means and cam control element are supported for yielding displacement relative to each other in the directions of oscillatory movement of said support element about said substantially vertically oriented axis.

9. Apparatus for separating settled solids from liquid medium as defined in claim 8 further characterized in that said cam control element is supported for pivotal movement about a horizontal axis radially disposed relative to said substantially vertically oriented axis of said support element, and wherein limit stop means is operatively associated with said pivotal support element for limiting the pivotal movement of said pivotal support element in opposite directions about said radially disposed axis, with yielding means for biasing said support element against at least one of said limit stop means.

10. Apparatus for separating settled solids from liquid medium as defined in claim 9 further characterized in that said limit stop means is selectively adjustable for varying the amount of said pivotal movement of said control element.

11. Apparatus as in claim 5 wherein said support element is a pulley having an annular groove and said rake assemblies are supported by an endless cable passing through said groove.

12. Apparatus as in claim 5 including cam means operatively associated with said support element for overbalancing said rake assemblies in relatively opposite directions at the opposite ends of the strokes of said rake assemblies.

13. A twin-rake apparatus for separating settled solids from liquid medium comprising in combination a pair of side-by-side settling tanks each having a bottom wall inclining upwardly in the same longitudinal direction in each tank, a pair of similar rake assemblies one associated with each of said tanks, a pair of pulleys mounted on vertical axes, one at each end of said tanks, an endless cable passing around said pulleys with one run of the cable lying above each rake assembly, means for supporting each rake assembly on the corresponding run of the cable, means for imparting an oscillatory movement to said end pulleys whereby said rake assemblies will be given a reciprocatory movement in said tanks, means for supporting said pulleys for tilting movement about a horizontal axis located centrally between and parallel to the runs of the cable, and cam means responsive to oscillation of the pulleys for alternately raising one run of the cable and lowering the other and then lowering said one run and elevating said other run, the arrangement being such that each rake assembly will be lowered when it moves toward the upper end of said inclined bottom wall and raised when it moves toward the lower end thereof.

* * * * *